United States Patent
Lee et al.

(10) Patent No.: US 6,870,591 B2
(45) Date of Patent: Mar. 22, 2005

(54) LIQUID CRYSTAL DISPLAY WITH SEPARATING WALL

(75) Inventors: Yu-Chi Lee, Taipei (TW); Po-Hsiu Shih, Taipei Hsien (TW)

(73) Assignee: Chunghwa Picture Tubes, Ltd. (TW)

( * ) Notice: Subject to any disclaimer, the term of this patent is extended or adjusted under 35 U.S.C. 154(b) by 0 days.

(21) Appl. No.: 10/347,957

(22) Filed: Jan. 21, 2003

(65) Prior Publication Data

US 2004/0141143 A1 Jul. 22, 2004

(51) Int. Cl.⁷ ............................................. G02F 1/1339
(52) U.S. Cl. ...................................................... 349/153
(58) Field of Search ................................. 349/153, 190, 349/106, 42

(56) References Cited

U.S. PATENT DOCUMENTS

| | | | | |
|---|---|---|---|---|
| 4,647,156 A | * | 3/1987 | Fujimura et al. | 349/153 |
| 6,400,439 B1 | * | 6/2002 | Fujioka et al. | 349/153 |
| 6,573,972 B2 | * | 6/2003 | Sasaki | 349/190 |
| 6,593,992 B1 | * | 7/2003 | Chin et al. | 349/153 |

* cited by examiner

*Primary Examiner*—Toan Ton
(74) *Attorney, Agent, or Firm*—Paper Hamilton LLP

(57) ABSTRACT

A liquid crystal display with separating wall is described. The liquid crystal display is manufactured by a one drop fill process. The display comprises a first substrate, a second substrate, a liquid crystal layer and a seal. The separating wall is formed on the first substrate and around a periphery of the first substrate in a non-display area to block efficiently the liquid crystal from spilling out. The height of the separating wall is close to a cell gap, and therefore the separating wall can utilize a technology of spacer on color filter to produce and adjust height thereof. Hence, the quality of liquid crystal displays can be improved and manufacture cost can be reduced.

16 Claims, 1 Drawing Sheet

LIQUID CRYSTAL DISPLAY WITH SEPARATING WALL

FIELD OF THE INVENTION

The present invention relates to a liquid crystal display and especially to a liquid crystal display with a separating wall.

BACKGROUND OF THE INVENTION

Recently, liquid crystal displays (LCD) have been widely applied in electrical products, due to the rapid progress of optical technology and semiconductor technology. Moreover, with the advantages of high image quality, compact size, light weight, low driving voltage, and low power consumption, LCDs have been introduced into portable computers, personal digital assistants, color televisions, and replaced gradually the cathode ray tubes (CRT) used for conventional displays. LCDs are becoming a mainstream display apparatus.

The main part of an LCD is a liquid crystal (LC) unit composed of two parallel transparent substrates with LC sealed therein. The main trend in LCDs is thin film transistor (TFT) LCD. The fabrication processes of a TFT-LCD can be divided into four parts: TFT array process, color filter (CF) process, LC cell assembly process, liquid crystal module (LCM) process.

The TFT array process is used to fabricate a TFT substrate. Each TFT respectively aligns with one pixel electrode. The CF process is used to fabricate color filter substrate. A color filter layer composed of different color filter sheet is on the color filter substrate, and a black matrix layer surrounds each color filter sheet.

The LC cell assembly process is used to parallel assemble TFT substrate and CF substrate. Bead spacers are spread between the TFT substrate and the CF substrate to maintain a fixed distance, i.e. a cell gap, therebetween. LC is injected into the cell gap and then the injection opening is sealed. Basically, each pixel electrode respectively corresponds to one color filter sheet, and the black matrix layer covers TFTs and metal lines that connect different TFTs.

The LCM process is used to attach a polarizer to a panel, and electrically connect driver IC and panel circuit. Then a reflector and a back-light are assembled on the panel. After a burn-in step, the LCM process is finished.

Generally, the direction of liquid crystal molecule axes, which are controlled by TFT, determines whether each pixel is pervious to light or not. The color of each pixel is determined by the color of color filter sheet. For example, when light passes through a red color filter sheet, a red spot is shown on the panel. Mixing red, green and blue colors can show full-color images.

Since the molecular axes of liquid crystal molecules, which are between pixel electrodes and color filter sheets, have to be controlled precisely, the color filter and the TFT substrate must be aligned precisely. The tolerable error of alignment is only within several micrometers.

Conventional LC injection is a complicated procedure in the TFT-LCD fabrication process. One drop fill (ODF) process can simplify the fabrication processes. In ODF process, use of a thermal hardening seal can reduce the manufacture cost. But a thermal hardening seal needs a long time to fully harden in a heating chamber. Therefore, the unhardened seal may contact the liquid crystal and pollute the liquid crystal, and the substrates may not glue well.

SUMMARY OF THE INVENTION

There is a need to improve the situation where a liquid crystal is polluted by an unhardened seal, whereby the LCD yield and quality can be increased. It is therefore an object of the present invention to provide a liquid crystal display with a separating wall to delay movement of the liquid crystal, resulting in reduced pollution of the liquid crystal and improved quality of the liquid crystal display.

It is another object of the present invention is to provide a liquid crystal display with a separating wall to reduce the cost of the liquid crystal display.

To accomplish the above objectives, the present invention provides a liquid crystal display with a separating wall for fabricating the liquid crystal display with one drop fill technology. The liquid crystal display comprises a first substrate, a second substrate, a separating wall, a liquid crystal layer, and a seal.

The separating wall is positioned on the first substrate to form a closed loop on the non-display area of the liquid crystal display. The liquid crystal layer is manufactured by the one drop fill technology and formed on the first substrate inside the separating wall. The seal encircles the separating wall to glue the first substrate to the second substrate and form a chamber for storing the liquid crystal. The substrates comprise a substrate of thin film transistors and a substrate of color filters. The seal comprises an ultraviolet-type seal or thermal hardening seal.

The first substrate and the second substrate are glued together and internal air is exhausted in a vacuum chamber. The height of the separating wall is nearly equal to a cell gap and is formed and adjusted by a spacer on color filter technology.

BRIEF DESCRIPTION OF THE DRAWINGS

The foregoing aspects and many of the attendant advantages of this invention are more readily appreciated as the same becomes better understood by reference to the following detailed description, when taken in conjunction with the accompanying drawings, wherein.

DETAILED DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1A:
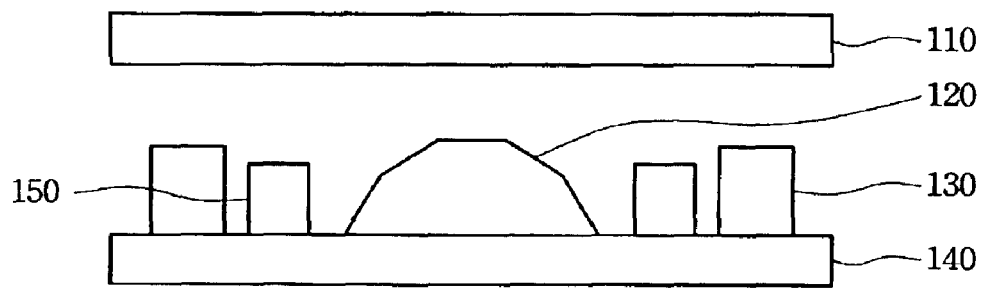
FIG. 1A is a schematic cross-sectional view of a preferred embodiment of a TFT-LCD according to the present invention prior to TFT-LCD assembly.

FIG. 1A shows a schematic, cross-sectional view of a preferred embodiment of a TFT-LCD according to the present invention prior to TFT-LCD assembly. The TFT-LCD has a first substrate 110 and a second substrate 140, both made of transparent glass.

The first substrate 110 and second substrate 140 are substrates for the TFT and the color filter. In the ODF process, the liquid crystal 120 drops on the second substrate 140. The seal 130 is spread on the second substrate 140. Afterwards the substrates are transferred to a vacuum chamber to exhaust the air between the first substrate 110 and the second substrate 140 by applying pressure on the surface of the substrates. The liquid crystal can be dropped on the first substrate or the second substrate. The processes of spreading the seal process and dropping the liquid crystal can be performed in any order or simultaneously. After the substrates are glued together, the substrates are transferred to the vacuum chamber to exhaust the internal air.

In conventional ODF process, the seal is an ultraviolet-type seal which is pre-hardened by exposure to an ultraviolet ray. If the liquid crystal contacts the seal after the seal is pre-hardened well, the seal does not pollute the liquid crystal. But the ultraviolet-type seal is very expensive and the quality is dependent on the pre-hardening condition. The cost of the TFT-LCD can be reduced, if the TFT-LCD utilizes a thermal hardening seal to seal panels thereof. The thermal hardening seal needs a longer time to pre-harden a surface thereof to avoid the pollution problem. Therefore, there is a need to delay contact between the liquid crystal and the unhardened seal.

Referring to FIG. 1A, a separating wall 150 positioned on an inner side of the seal 130 forms a closed loop. Both are located in a non-display area of the TFT-LCD. The liquid crystal drops inside the closed loop. Traditional TFT-LCD is a rectangular display; therefore the seal 130 and the separating wall 150 form rectangular closed loops. The shape of the separating wall is not limited in the present invention. The separating wall according to the present invention may fit any display shape. The present invention utilizes the separating wall 150 to delay contact between the liquid crystal and the unhardened seal 130. Therefore, the pollution problem can be solved.

Figure 1B:
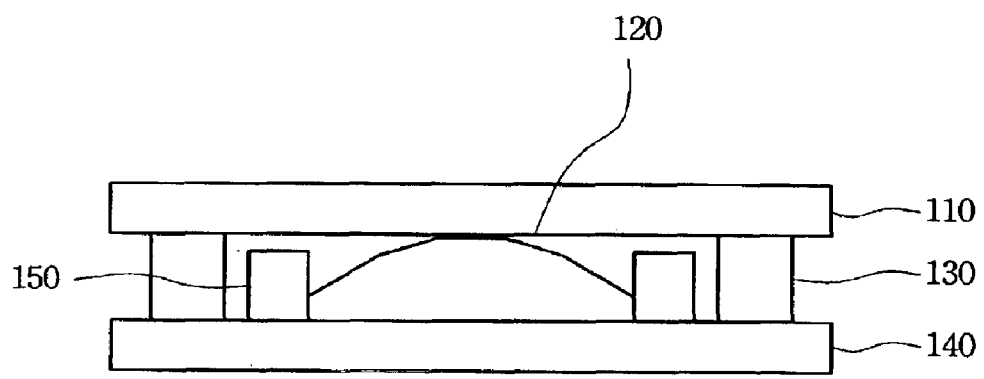
FIG. 1B is a schematic, cross-sectional view of the preferred embodiment of FIG. 1A after TFT-LCD assembly.

FIG. 1B shows a schematic, cross-sectional view of the preferred embodiment of FIG. 1A after TFT-LCD assembly. After the seal 130 spreads and the liquid crystal 120 drops on the first substrate 110 with ODF technology, the substrates are pressed under pressure to exhaust internal air. The liquid crystal 120 is also under pressure. Accordingly, the liquid crystal 120 extends outward. When the liquid crystal 120 contacts the separating wall 150, the liquid crystal stops moving outward. Therefore, the time is sufficient to heat the seal in a heating chamber to pre-harden the seal 130. Pollution of the liquid crystal is avoided altogether.

The TFT-LCD according to the present invention can use the thermal hardening seal to seal the panels. Therefore, the cost of the TFT-LCD according to the present invention can be reduced.

Further, because the separating wall can delay contact between the liquid crystal and the seal, the separating wall can be used with both a thermal hardening seal and an ultraviolet-type seal to avoid pollution. Hence, the separating wall can be used with any type seal in TFT-LCD assembly process.

Furthermore, the height of the separating wall is nearly equal to the cell gap. Accordingly, the separating wall can be produced and adjusted by the spacer on color filter technology to get a preferred height thereof. The separating wall and the spacer can complement each other.

The separating wall according to the present invention can reduce the pollution problem, defect rates, and cost. The present invention provides a great contribution in the TFT-LCD manufacture. As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structures.

What is claimed is:

1. A liquid crystal display with a separating wall for fabricating the liquid crystal display with one drop fill technology, the liquid crystal display comprising:

a first substrate;

a second substrate;

a separating wall only disposed on the first substrate to form a closed loop on the non-display area of the liquid crystal display;

a liquid crystal layer formed by the one drop fill technology on the first substrate and inside the separating wall; and a seal encircling the separating wall to glue the first substrate to the second substrate and to form a chamber for storing the liquid crystal layer, wherein the separating wall delays contact between the liquid crystal and the seal.

2. The liquid crystal display of claim 1 wherein the first substrate is a substrate of thin film transistors and the second substrate is a substrate of color filters.

3. The liquid crystal display of claim 1 wherein the first substrate is a substrate of color filters and the second substrate is a substrate of thin film transistors.

4. The liquid crystal display of claim 1 wherein the seal comprises an ultraviolet-type seal.

5. The liquid crystal display of claim 1 wherein the seal comprises a thermal hardening seal.

6. The liquid crystal display of claim 1 wherein the seal glues the first substrate to the second substrate in a vacuum chamber.

7. The liquid crystal display of claim 6 wherein air in the chamber for storing the liquid crystal layer is exhausted in the vacuum chamber.

8. The liquid crystal display of claim 1 wherein a height of the separating wall is nearly equal to a cell gap.

9. The liquid crystal display of claim 1 wherein the separating wall is produced and adjusted by a spacer on color filter technology.

10. A liquid crystal display with a separating wall to avoid a unhardened seal polluting the liquid crystal, the liquid crystal display comprising a first substrate;

a second substrate;

a separating wall only disposed on the first substrate to form a closed loop on the non-display area of the liquid crystal display;

a liquid crystal layer formed by the one drop fill technology on the first substrate and inside the separating wall; and a thermal hardening seal encircling the separating wall to glue the first substrate to the second substrate and to form a chamber for storing the liquid crystal layer, wherein the separating wall delays contact between the liquid crystal layer and the thermal hardening seal.

11. The liquid crystal display of claim 10 wherein the first substrate is a substrate of thin film transistors and the second substrate is a substrate of color filters.

12. The liquid crystal display of claim 10 wherein the first substrate is a substrate of color filters and the second substrate is a substrate of thin film transistors.

13. The liquid crystal display of claim 10 wherein the seal glues the first substrate to the second substrate in a vacuum chamber.

14. The liquid crystal display of claim 13 wherein air in the chamber for storing the liquid crystal layer is exhausted in the vacuum chamber.

15. The liquid crystal display of claim 10 wherein a height of the separating wall is nearly equal to a cell gap.

16. The liquid crystal display of claim 10 wherein the separating wall is produced and adjusted by a spacer on color filter technology.

* * * * *